United States Patent [19]

Bhatt

[11] Patent Number: 4,681,397

[45] Date of Patent: Jul. 21, 1987

[54] OPTICAL SWITCHING ARRANGEMENT

[75] Inventor: Vipul Bhatt, Lincoln Park, N.J.

[73] Assignee: AMP Incorporated, Harrisburg, Pa.

[21] Appl. No.: 750,722

[22] Filed: Jun. 28, 1985

[51] Int. Cl.$^4$ .............................................. G02B 6/36
[52] U.S. Cl. .............................. 350/96.20; 350/96.13
[58] Field of Search ............... 350/96.13, 96.15, 96.16, 350/96.20

[56] References Cited

U.S. PATENT DOCUMENTS

| | | | |
|---|---|---|---|
| 4,011,543 | 3/1977 | Soref et al. | 350/96.13 |
| 4,013,000 | 3/1977 | Kogelnik | 350/96.13 |
| 4,153,329 | 5/1979 | Gillette | 350/96.13 |
| 4,315,666 | 2/1982 | Hicks, Jr. | 350/96.15 |
| 4,342,499 | 8/1982 | Hicks, Jr. | 350/96.15 |
| 4,493,528 | 1/1985 | Shaw et al. | 350/96.15 |
| 4,556,279 | 12/1985 | Shaw et al. | 350/96.15 |
| 4,564,262 | 1/1986 | Shaw | 350/96.15 |

FOREIGN PATENT DOCUMENTS

| | | | |
|---|---|---|---|
| 0069504 | 5/1982 | European Pat. Off. | |
| 0053931 | 4/1980 | Japan | |
| 0120238 | 9/1980 | Japan | |
| 0019002 | 2/1981 | Japan | 350/96.15 |
| 0042445 | 4/1981 | Japan | |
| 0020043 | 2/1982 | Japan | |
| 0059638 | 4/1983 | Japan | |
| 0039131 | 3/1984 | Japan | |

OTHER PUBLICATIONS

"A Fiber Optical Relay for Bypassing Computer Network" by Rawson et al., Optical Engineering, vol. 19, No. 4, Jul./Aug. 1980, pp. 628-629.

"Wavelength Multiplexing in Single-Mode Fiber Couplers" by Shaw et al, Applied Optics, vol. 22, No. 3, Feb. 1, 1983, pp. 484-491.

"Filter Characteristic of Codirectionally Coupled Waveguides with Weighted Coupling" by Alferness et al, IEEE Journal of Quantum Elect., vol. QE-14, No. 11, Nov. 1978, pp. 843-847.

"Filter Response of Nonuniform Almost-Periodic Structers" by Kogelink, The Bell System Tech. Journal, vol. 55, No. 1, Jan. 1976, pp. 109-126.

"Optical Directional Couplers with Variable Spacing" by Chin-Lin et al, Appl. Optics, vol. 17, No. 5, Mar. 1, 1978, pp. 769-773.

"Wavelength Selective Distributed Coupling Between Single Mode Optical Fibers for Multiplexing" by Parriaux et al, J. of Optical Comm., vol. 2, No. 3, 1981, pp. 105-109.

"Tunable Optical Waveguide Directional Coupler Filter" by Alferness, Applied Physics Letters, vol. 33, No. 2, Jul. 15, 1978, pp. 161-163.

"Some Theory and Appl. of Periodically Coupled Waves", The Bell System Tech. System Journal, Sep. 1969, pp. 2189-2219.

"Wavelength Division Multiplexing (WDM) Couplers" by Williams, Fiber Optics-Tech., '82, SPIE, vol. 326, 1982, pp. 76-82.

"Patents Patter: 1," by Lovell, Applied Optics, vol. 22, No. 24, Dec. 15, 1983, pp. 3913-3916.

"Analysis of a Tunable Single Mode Optical Fiber Coupler" by Digonnet et al, IEEE J. of Quantum Electronics, vol. QE-18, No. 4, Apr. 1982, pp. 746-754.

"Paired O. Fiber Switch for Optical Data-Bus Systems", by Aoki et al, Optics Letters, vol. 4, No. 11, Nov. 1979, pp. 346-347.

Primary Examiner—William L. Sikes
Assistant Examiner—Akm E. Ullah

[57] ABSTRACT

A cross point of an N×M optical switching network is defined by a pair of switches, a first of which couples optical information from a row waveguide to a bypass waveguide. The second switch couples the information from the bypass to a column waveguide. An optical eraser may be employed to absorb any information not switched. The eraser is positioned along the row waveguide downstream of the cross point. Each switch at a cross point as well as the eraser includes actuators which, in fiber optic embodiments, move the respective elements of the switch (or eraser) from positions at which only negligible coupling occurs to more closely spaced positions at which significant coupling occurs, upon command.

8 Claims, 5 Drawing Figures

OPTICAL SWITCHING ARRANGEMENT

FIELD OF THE INVENTION

This invention relates to optical switches and to arrangements of such switches for implementing switching networks.

BACKGROUND OF THE INVENTION

The cost effectiveness of switching networks employing waveguides, most typically optical fibers, is well recognized. Consequently, considerable effort is being expended both in the United States and abroad to realize such systems.

Copending applications Ser. No. 750,805 filed for "Optical Switch Arrangement" and Ser. No. 750,811 filed for "Optical Eraser and Node Switch for an Optical Network", all on even date herewith, disclose waveguide switches, erasers, and network components for implementing novel optical networks.

BRIEF DESCRIPTION OF THE ILLUSTRATIVE EMBODIMENT

The present invention is directed at an optical switching network for connecting a plurality of input lines to a plurality of output lines (N×M Switch) such as would be required for telephone switching. The illustrative switching network employs M input fibers arranged along rows and N output fibers arranged along columns defining a matrix of cross points between them. Information being transmitted along an input fiber (a row fiber) is routed to a selected one (or more) output (column) fiber by a unique switching arrangement located at each cross point.

Information switching at a cross point specifically is accomplished by first and second switches which are operated synchronously. The two switches at a cross point share a common optical fiber. The first switch also is adapted for coupling to a row fiber while the second switch is adapted for coupling to a column fiber. Each switch is adapted for coupling the common fiber to a row and an intersecting column fiber such that information entering a row fiber is coupled to the common fiber at a selected cross point. The information then is routed from the common fiber to the column fiber at that cross point.

The coupling of the row and column fibers to the common fiber at a selected cross point is accomplished illustratively by first and second transducers operative to reduce the spacings between the row and common fibers in the first switch and between the common fiber and the column fiber in the second switch as disclosed in copending application Ser. No. 750,805 mentioned above. Such routing requires the synchronous operation of both switches at a cross point to make the proper selection.

Accordingly the transducers of each pair of switches in the switching matrix are operated in tandem via a cross point selection decoder. The network also may function to connect a row fiber to a number of column fibers to allow for conference calls. This is implemented by activating the cross point switches at more than one column along a row fiber. An optical eraser is placed downstream of each cross point operative to absorb or pass information transmitted along a row fiber selectively. If a pair of switches is selected and a conference call is not desired, the associated eraser is activated to absorb any information (optical energy) not switched to the selected column fiber. If a conference call is desired, the associated eraser is not activated.

DETAILED DESCRIPTION

Figure 1:
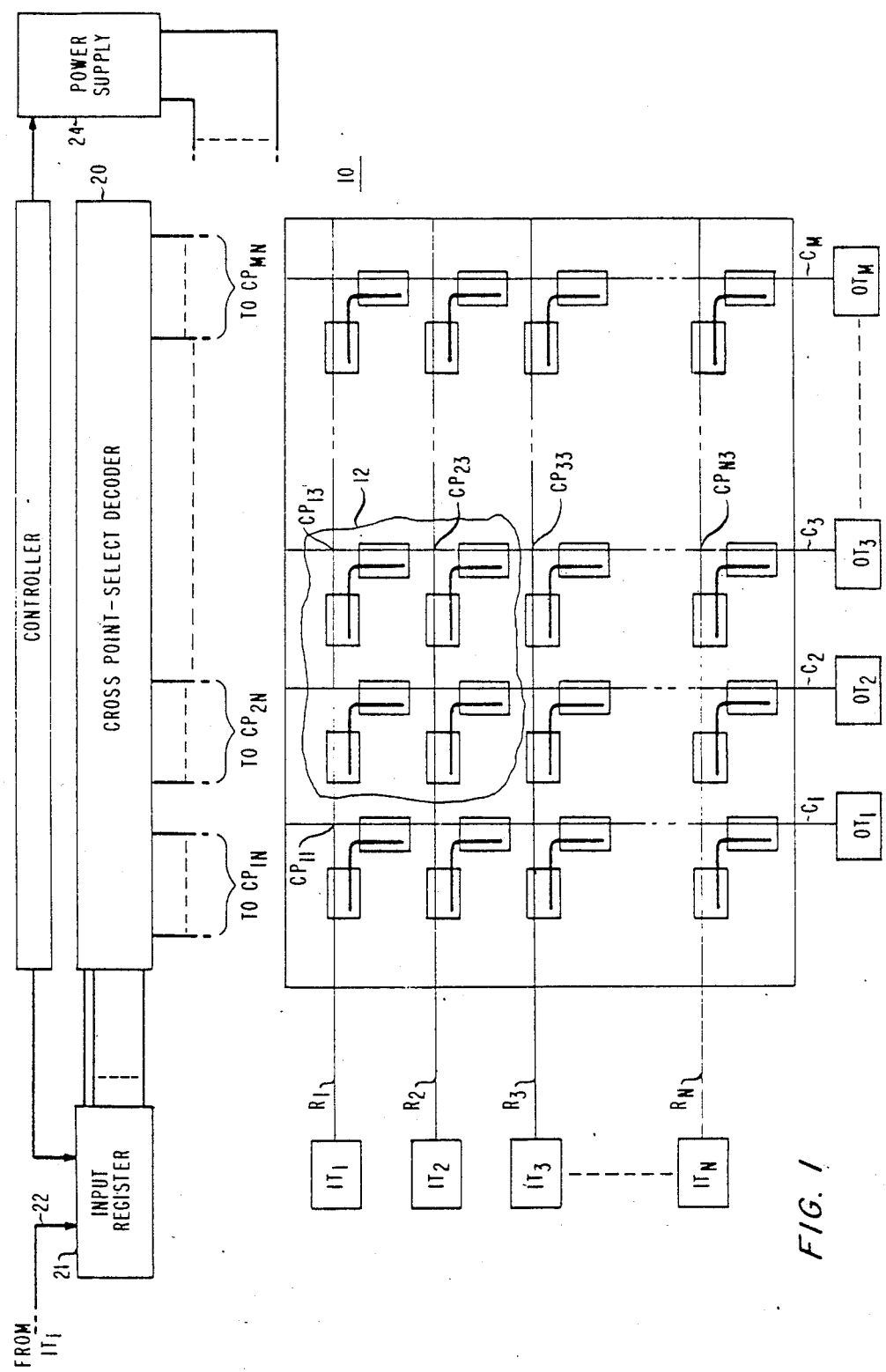
FIG. 1 is a schematic block diagram of an N×M switch in accordance with one aspect of this invention.

FIG. 1 shows an N×M switch 10 including N row optical fibers $R_1$, $R_2$,—$R_N$ and M column optical fibers $C_1$, $C_2$, $C_3$,—$C_M$. The row and column fibers define cross points where they intersect. The cross points (CP) are designated $CP_{11}$, $CP_{12}$, $CP_{13}$,—$CP_{NM}$ where the first and second subscripts correspond to the row and column which define the cross point. Thus, the cross point defined by the intersection of row $R_N$ and column $C_3$ is designated $CP_{N3}$ as shown in the figure.

Figure 2:
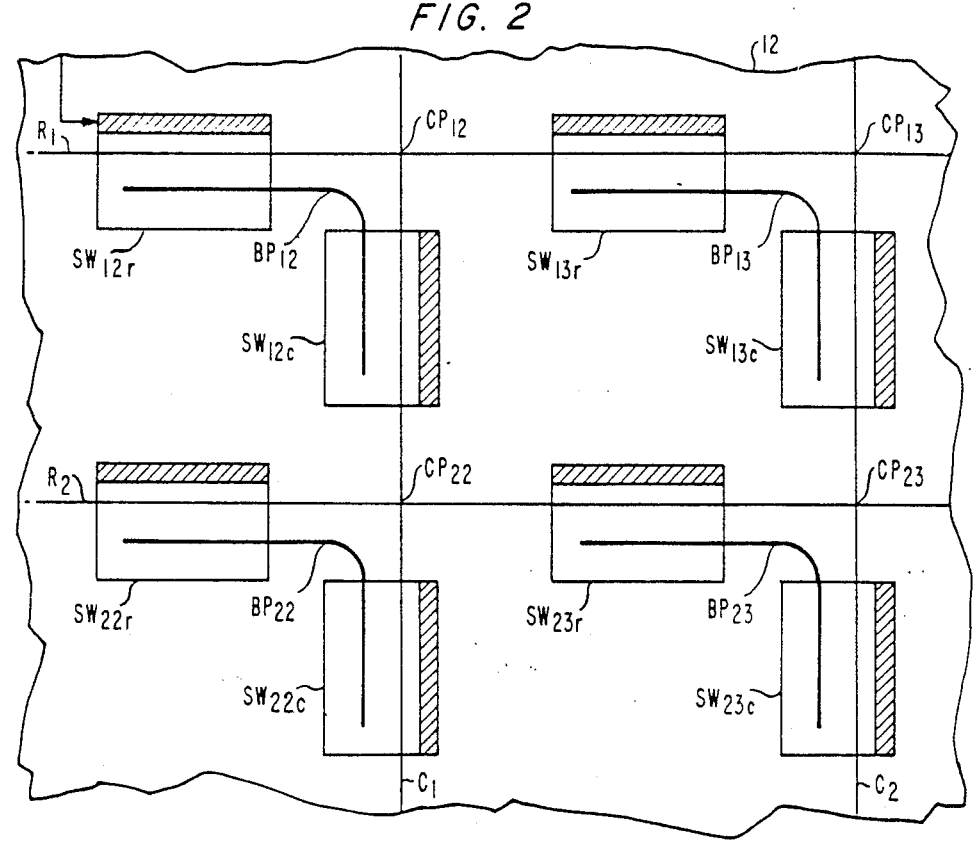
FIGS. 2 and 3 are enlarged views of portions of the switch of FIG. 1.

A cross point switch arrangement is located at each cross point. The arrangement comprises a pair of sleeve switches, each of a structure disclosed in the copending application Ser. No. 750,805 mentioned above. FIG. 2 shows an enlarged view of a portion 12 of FIG. 1 illustrating the structure and relationship between the switches at each cross point. Four cross points $CP_{12}$, $CP_{13}$, $CP_{22}$ and $CP_{23}$ are shown in FIG. 2. Each cross point is shown with first and second sleeve switches associated with it. For example, the first and second sleeve switches at cross point $CP_{12}$ are designated $SW_{12R}$ and $SW_{12C}$ where the numerical portion of the subscript indicates the row and column intersecting at the cross point and the letter indicates whether the switch is associated with the row or the column at the cross point. Accordingly, the switch associated with row fiber $R_1$ at cross point $CP_{12}$ is designated $SW_{12R}$ whereas the switch associated with column fiber $C_2$ at cross point $CP_{23}$ is designated $SW_{23C}$.

Figure 3:
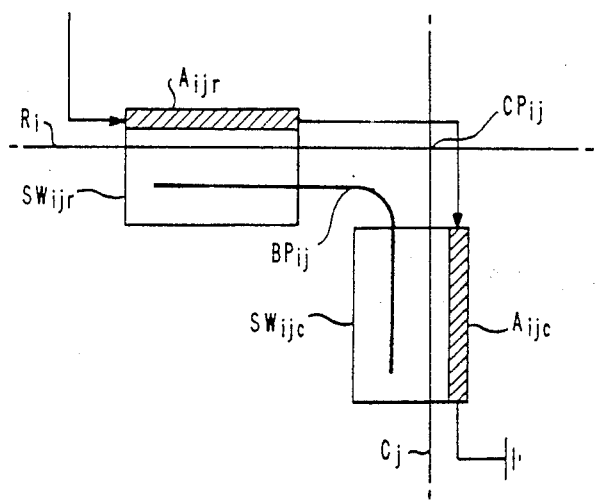

We will adopt the convention that i and J are dummy variables of a representative cross point $CP_{iJ}$ shown in FIG. 3. The associated switches accordingly are designated $SW_{ijr}$ and $SW_{ijc}$. The corresponding row and column are designated $R_i$ and $C_J$ respectively. $R_i$ thus can be any row from $R_i$ to $R_N$ whereas $C_J$ can be any column from $C_1$ to $C_M$.

It is helpful to understand generally how each switch $SW_{iJr}$ or $SW_{iJC}$ operates. Accordingly, a brief description of the structure and operation of such a switch is presented to facilitate an understanding of the present invention. Each such switch, as for example switch $SW_{iJR}$ in FIG. 3, includes first and second optical fibers. In this instance, the first fiber is now fiber $R_i$ as shown. The second fiber is a bypass fiber $BP_{iJ}$. The first and second fibers are held in close priximity within the switch. Moreover, the cladding on each fiber is reduced in thickness or removed altogether within the confines of the switch in the areas of the fibers which face one another.

Each switch operates to physically move the first and second fibers from first positions at which only negligible coupling occurs therebetween to second more closely spaced positions at which significant coupling occurs therebetween. Movement of the fibers is effected by an actuator which typically is a piezoelectric element in practice. The actuator is designated $A_{iJR}$ or $A_{iJC}$ in FIG. 3 depending on whether it is associated with the row fiber or the column fiber there.

Information being carried by fiber $R_i$ is shunted into bypass fiber $BP_{iJ}$ and then into fiber $C_J$ when actuators $A_{iJR}$ and $A_{iJC}$ are activated. It is to be noted that fiber $BP_{iJ}$ terminates at one end within switch $SW_{iJR}$ and at the other end within switch $SW_{iJC}$. It originates from and goes nowhere. It serves a purpose only when the actuators of both switches at the cross point are activated. We have now shown how information on a single input (row) fiber is switched to a single output column fiber.

Each switch at a cross point typically is filled with a fluid (liquid or gas) which has an index of refraction essentially the same as that of the cladding of the fibers. Thus, the fluid acts to provide a variable thickness cladding to the fibers as they are moved between the first and second positions. If we assume that not all the energy being carried by a row fiber is switched into a selected column fiber, that energy which is not switched can be switched into other column fibers further along the row fiber permitting a conferencing operation between a terminal connected to a selected row fiber and several terminals connected to various column fibers.

The choice as to whether or not all energy is switched to a selected column fiber and as to whether or not unswitched energy is absorbed or switched at other cross points along a row fiber is determined by the structure of the switch $SW_{iJR}$, the operation of an optical eraser which may be associated with each cross point and the selection (activation) or actuators at other row switches. These choices are now discussed in connection with FIG. 4.

Figure 4:
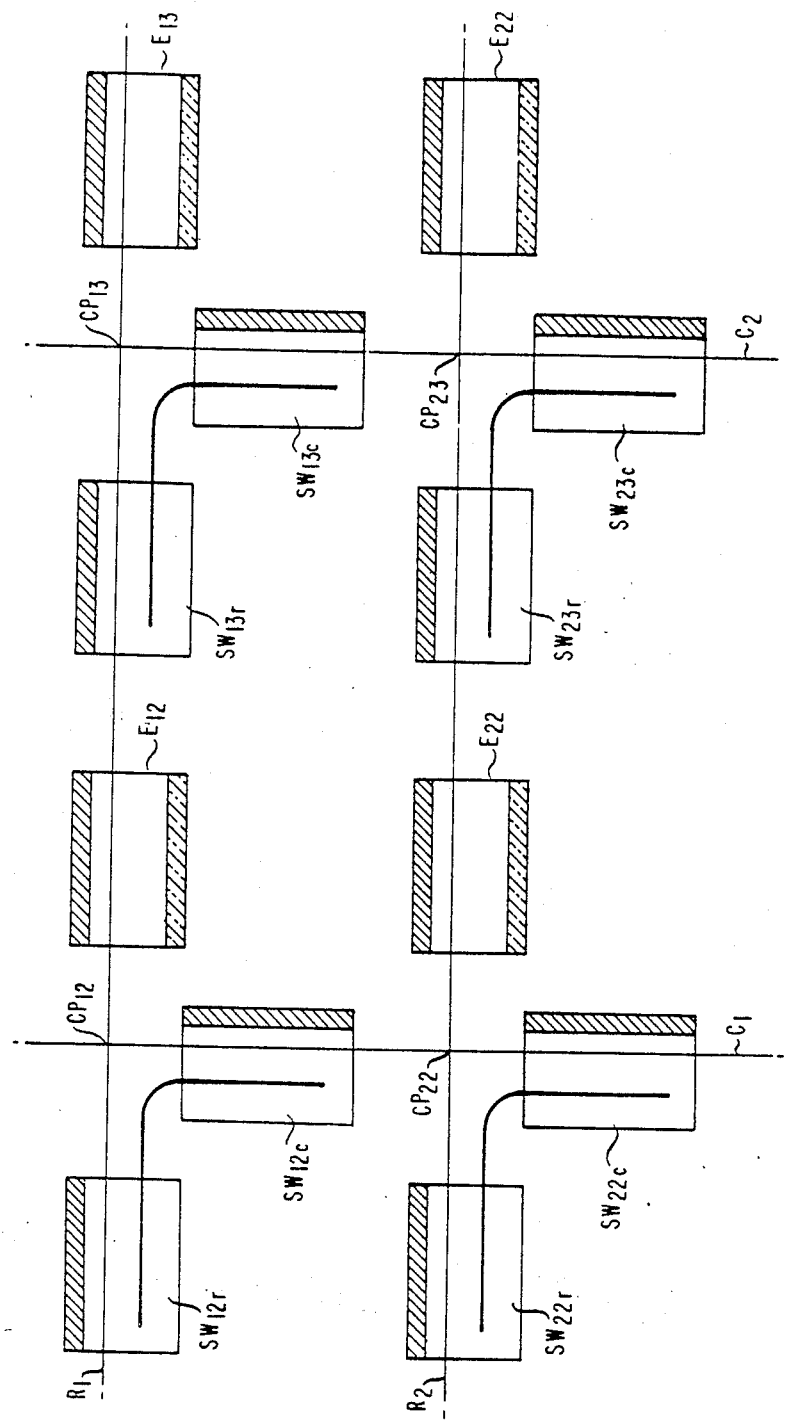
FIGS. 4 and 5 are enlarged alternative views of a network of the type shown in FIG. 1.
Figure 5:
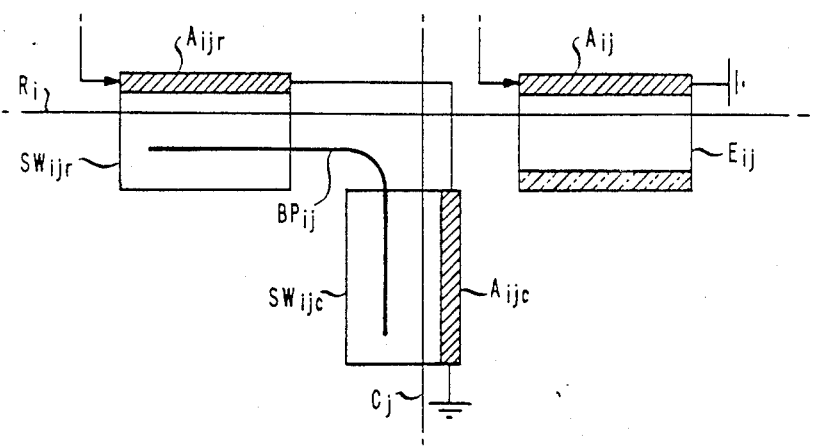

FIG. 4 is essentially the same as FIG. 2 with the addition of an optical eraser. The eraser serves the function of absorbing energy (information) being carried by a fiber. An eraser suitable for this purpose is disclosed in copending application Ser. No. 750,811 mentioned above. The eraser employs an actuator to reduce the separation between an optical fiber and a block of quartz with properties to absorb optical energy. The fiber and the block are switched from first positions at which only negligible energy is absorbed to second, more closely spaced positions at which essentially all energy is absorbed. The eraser is identified by the notation $E_{iJ}$ in FIG. 5 where again, i and J are dummy variables. The erasers in FIG. 4 are identified to correspond to the cross point of FIG. 2 for ease of comparison. Erasers couple only row fibers in the embodiment of FIGS. 4 and 5. Consequently, an R or C designation in the subscript is unnecessary.

If it is desired to connect a particular input terminal to a particular output terminal, the row ($R_i$) and column ($C_J$) to which those terminals are connected are interconnected by activating the actuators $A_{iJR}$, $A_{iJC}$, and $A_{iJ}$ of switches $SW_{iJR}$, $SW_{iJC}$, and eraser $A_{iJ}$. As a result, information is shunted from Row $R_i$ to Column $C_J$ and any energy not shunted is absorbed by absorber $E_{iJ}$.

If it is desired that the network be adapted for conference calls, fiber $R_i$ may be made larger than bypass $BP_{iJ}$. Also, the actuators for switch $A_{iJR}$ may be adapted to apply several different pressures to provide different degrees of coupling to bypass fiber $BP_{iJ}$. Moreover, the actuator $A_{iJ}$ also could be so adapted to permit different degrees of absorption. It is clear that the switching apparatus at each cross point could be adapted to pass information along a row fiber as well a shunting that information.

In the event that information in a row fiber $R_i$ is to be shunted to more than one column fiber for a conference call, the switches at the corresponding cross points are operated as described above. In the simplest case where row and column fibers are of like size and the actuators are adapted to move only between first and second spaced apart positions as described above, the condition of the erasers is controlling. That is to say, all the erasers upstream of the last column fiber to receive information are deactivated. The eraser downstream of that last column fiber is activated. To accomplish such operation, the actuator for the eraser at a selected cross point is driven independently of the actuators for the switches at the corresponding cross point. The two switches at the cross point may be connected electrically in series in this simplest organization.

The various operations of the nework of FIGS. 1, 2 and 4 depend on the manner in which the various actuators are activated as indicated above. FIG. 1 shows a cross point select decoder 20 adapted to apply the proper voltages to electrical conductors connected to the actuators of the various cross points responsive to coded address signals originating at an input terminal $IT_i$. That address (viz: telephone number) is applied to the input of an input register 21 of FIG. 1 via input 22 and applied to decoder 20. Decoder 20 may be a read only memory (ROM) or a programmable logic array (PLA) adapted to apply the requisite signals for enabling power supply 24 to apply requisite voltage to the proper actuators.

A separate power supply output and decoder output is employed for each pair of switches at a cross point and for the eraser there.

The invention has been described in terms of fiber optic embodiments. But integrated optic circuits also can be used. Integrated optic components suitable for implementing networks as disclosed herein are disclosed in the above-mentioned copending applications.

What is claimed is:

1. Optical apparatus adapted for switching information from a first to a second waveguide, said apparatus comprising first and second sleeve switches, said first sleeve switch comprising said first waveguide and a third waveguide in spaced apart first positions at which only negligible coupling occurs therebetween, said second sleeve switch comprising said second waveguide and said third waveguide in spaced apart first positions at which only negligible coupling occurs therebetween, each of said first and second sleeve switches including actuator means for moving the respective waveguides to second relatively close positions at which significant coupling occurs between said respective waveguides, said respective waveguides being adapted to permit information coupling therebetween.

2. Optical apparatus in accordance with claim 1 wherein said first and second waveguides are optical fibers disposed transverse to one another defining a cross point therebetween.

3. Optical apparatus in accordance with claim 1 also including an optical energy eraser, said eraser comprising said first waveguide and an optical absorber disposed in a spaced apart first position at which only negligible coupling occurs therebetween, and actuator means for moving said first waveguide and said absorber to second a more closely spaced second position at which significant coupling occurs therebetween, said first waveguide and said eraser being adapted to permit said significant coupling when said first waveguide moves to said second position.

4. Optical apparatus in accordance with claim 3 wherein said first and second waveguides are optical fibers disposed transverse to one another.

5. An optical N×M switching network comprising an array of cross points, each of said cross points being defined by optical apparatus in accordance with claim 2.

6. An optical N×M switching network comprising an array of cross points, each of said cross points being defined by optical apparatus in accordance with claim 3.

7. Optical apparatus adapted for switching information from a first to a second waveguide, said apparatus comprising first and second switches, said first and second switches including said first and second waveguides respectively, both said first and second switches including a third waveguide separated from said first and second waveguides by first and second media having optical characteristics of a cladding with respect to said waveguides, and actuator means responsive to a command signal for alternating said characteristics in a manner to achieve significant coupling between said first and third waveguides and between said third and second waveguides, wherein said characteristics are altered by physically moving said waveguides into relatively closely spaced positions at which significant coupling occurs therebetween.

8. Optical apparatus in accordance with claim 7 wherein said waveguides are optical fibers, and said first and second media comprise a liquid.

* * * * *